US008116887B2

(12) United States Patent  (10) Patent No.: US 8,116,887 B2
Park et al.  (45) Date of Patent: Feb. 14, 2012

(54) APPARATUS AND METHOD FOR PERFORMING AUXILIARY FUNCTIONS WHEN ELECTRONICS ARE SWITCHED TO HOLD

(75) Inventors: Jeong-hun Park, Yongin-si (KR); Young-Joon Ahn, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 251 days.

(21) Appl. No.: 11/737,522

(22) Filed: Apr. 19, 2007

(65) Prior Publication Data

US 2008/0140871 A1    Jun. 12, 2008

(30) Foreign Application Priority Data

Dec. 6, 2006  (KR) .................. 10-2006-0123374

(51) Int. Cl.
*H04B 5/00* (2006.01)
*H04B 7/00* (2006.01)
*H04M 3/00* (2006.01)
*H04M 1/00* (2006.01)
*H04W 24/00* (2009.01)
*H04W 4/00* (2009.01)
*G05B 11/01* (2006.01)

(52) U.S. Cl. ..... 700/11; 455/550.1; 455/425; 455/575.1; 455/41.1; 455/41.2; 455/556.1; 455/418; 455/426.2; 345/173; 345/156; 345/169

(58) Field of Classification Search .................. 345/168
See application file for complete search history.

(56) References Cited

U.S. PATENT DOCUMENTS

| 5,325,528 | A  | * | 6/1994 | Klein | 719/313 |
| 6,993,322 | B1 | * | 1/2006 | Kirby et al. | 455/410 |
| 7,414,613 | B2 | * | 8/2008 | Simelius | 345/168 |
| 7,660,578 | B2 | * | 2/2010 | Viitamaki et al. | 455/426.2 |
| 7,711,256 | B2 | * | 5/2010 | Wun | 396/56 |
| 2003/0034185 | A1 | * | 2/2003 | Kaikuranta | 178/18.01 |

(Continued)

FOREIGN PATENT DOCUMENTS

| JP | 2001-320477 | 11/2001 |
| KR | 10-2000-0008621 | 2/2000 |
| KR | 10-2005-0115120 | 12/2005 |
| KR | 10-20060072899 | 6/2006 |

OTHER PUBLICATIONS

Korean Patent Office Non-Final Rejection dated Mar. 17, 2011 corresponds to Korean Patent Application No. 10-2006-0123374.
Korean Notice of Allowance issued on May 31, 2011 corresponds to Korean Patent Application No. 10-2006-0123374.

*Primary Examiner* — Albert Decady
*Assistant Examiner* — Sunray Chang
(74) *Attorney, Agent, or Firm* — Staas & Halsey LLP

(57) ABSTRACT

A method and an apparatus for automatically performing auxiliary functions of an electronic device when the device is switched to hold mode. The apparatus includes a storage unit and a control unit. The storage unit stores a table that includes conditions to perform the auxiliary functions in an electronic device. The control unit automatically performs the auxiliary functions when the conditions are met after a hold switch is switched on in the electronic device. The method and apparatus determine the needs of a user when the user switches on the hold function in the electronic device, while at the same time determining the state of the electronic device, in order to perform needed auxiliary functions before switching to the hold mode. Thus, power is conserved and user convenience is enhanced.

33 Claims, 7 Drawing Sheets

U.S. PATENT DOCUMENTS

| | | | |
|---|---|---|---|
| 2003/0191948 A1* | 10/2003 | Nelson et al. | 713/185 |
| 2004/0259542 A1* | 12/2004 | Viitamaki et al. | 455/426.2 |
| 2005/0079896 A1* | 4/2005 | Kokko et al. | 455/566 |
| 2006/0012577 A1* | 1/2006 | Kyrola | 345/173 |
| 2006/0036876 A1* | 2/2006 | Kitada | 713/193 |
| 2006/0112428 A1* | 5/2006 | Etelapera | 726/16 |
| 2009/0149127 A1* | 6/2009 | Viitamaki et al. | 455/41.2 |

* cited by examiner

FIG. 7

|   | STATE OF ELECTRONIC DEVICE | AUXILIARY FUNCTION |
|---|---|---|
| 1 | AUDIO PLAYBACK ONLY (71) | LCD OFF (72) |
| 2 | MULTIPLE PROGRAMS LOADED (73) | END INACTIVE PROGRAMS (74) |
| 3 | SOME OF MULTIPLE PROCESSING UNITS ARE ACTIVE (75) | SHUT OFF POWER TO OTHER PROCESSING UNITS /SLEEP MODE (76) |
| 4 | RAW DATA TO GO THROUGH DATABASE OPERATION (77) | DATA BASE OPERATION (78) |

APPARATUS AND METHOD FOR PERFORMING AUXILIARY FUNCTIONS WHEN ELECTRONICS ARE SWITCHED TO HOLD

CROSS-REFERENCE TO RELATED APPLICATIONS

This application claims the benefit of Korean Patent Application No. 2006-123374, filed in the Korean Intellectual Property Office on Dec. 6, 2006, the disclosure of which is incorporated herein by reference.

BACKGROUND OF THE INVENTION

1. Field of the Invention

Aspects of the present invention relate to a hold function of an electronic device and, more particularly, to a method and an apparatus for automatically performing auxiliary functions of an electronic device while the device is in hold mode.

2. Description of the Related Art

Many conventional electronic devices have a hold function to prevent unwanted commands from being executed through the inadvertent pressing of function keys, which can happen when a user carries the electronic device in a pocket or bag.

When a user switches an electronic device to hold mode, it indicates that the user does not wish to input commands into the electronic device for the time being while the electronic device is in a pocket or bag. However, some conventional portable electronic devices do not take this fact into consideration, causing inconvenience to users.

For example, under normal conditions, if a user does not input commands using function keys for a certain time, the display of a portable electronic device automatically switches off if an auto off function has been enabled. When the electronic device is switched to hold, this action may be interpreted as the user not wanting to use the display for the time being, so it is desirable for the device to switch off the display immediately to conserve power. However, conventional electronic devices continue to maintain their current operating state, requiring users to manually deactivate the hold function and turn off the display to save power, which is inconvenient.

SUMMARY OF THE INVENTION

Aspects of the present invention provide an apparatus and method to perform auxiliary functions that a user wishes to have performed when the user switches an electronic device to a hold mode, thereby avoiding conventional problems associated with the hold function.

According to an aspect of the present invention, there is provided an apparatus to automatically perform auxiliary functions, the apparatus comprising a storage unit to store a table including conditions to perform the auxiliary functions in an electronic device; and a control unit to automatically perform the auxiliary functions when the conditions are met after a hold switch is switched on in the electronic device.

According to another aspect of the present invention, there is provided a method of automatically performing auxiliary functions, comprising switching on a hold switch of an electronic device; determining whether conditions for performing the auxiliary functions in the electronic device have been met; and automatically performing the auxiliary functions when the conditions for performing the auxiliary functions have been met.

According to a further aspect of the present invention, there is provided a computer-readable recording medium storing a program to implement a method including: determining whether conditions for performing auxiliary functions in the electronic device have been met when a hold switch of an electronic device is switched on; and automatically performing the auxiliary functions when the conditions for performing the auxiliary functions have been met.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 7 illustrates an example of a scenario table according to an embodiment of the present invention.

DETAILED DESCRIPTION OF THE EMBODIMENTS

Figure 1:
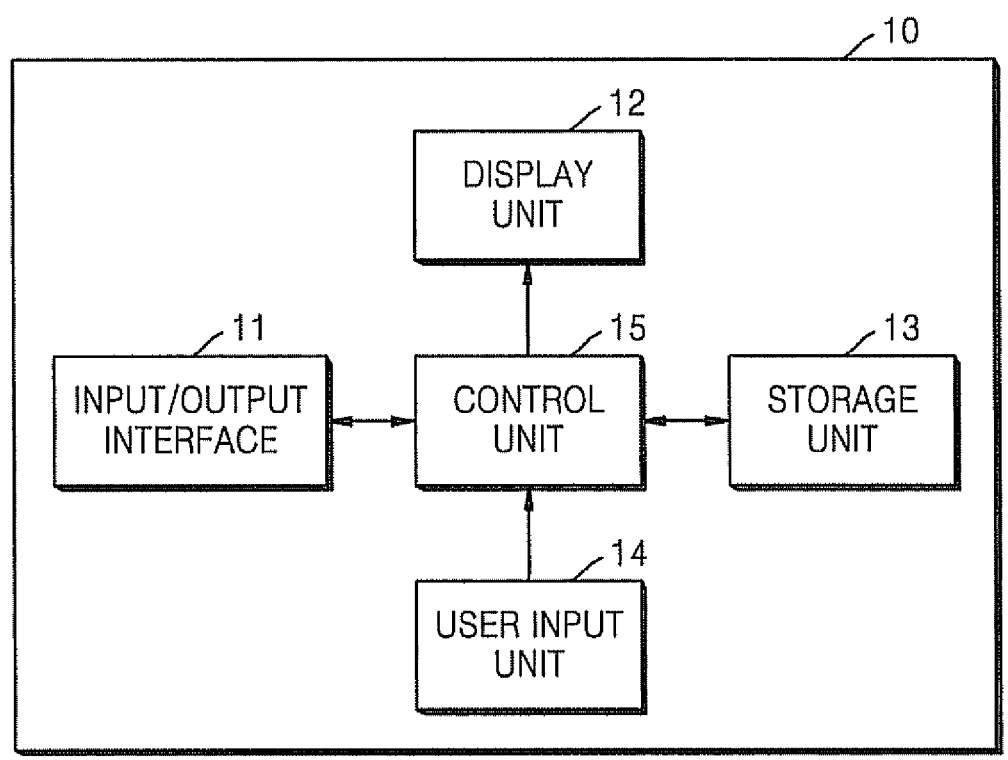
FIG. 1 is a block diagram of an apparatus that automatically performs auxiliary functions in an electronic device according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of an apparatus according to an embodiment of the present invention that automatically performs auxiliary functions in an electronic device while the device is in a hold mode. An electronic device 10 having the hold function may be one of various kinds of devices, including desktop computers, mobile phones, portable multimedia players (PMP), MPEG-1 audio layer 3 (MP3) players, digital media broadcasting (DMB) receivers, personal digital assistants, portable entertainment devices, and other portable devices that may require auxiliary functions to be performed automatically. The electronic device 10 includes a display unit 12, an input/output interface, a storage unit 13, a user input unit 14, and a control unit 15. The electronic device 10 may include various components such as a decoder, a buffer, speakers, etc. to perform innate functions of the device. However, these components are not shown in FIG. 1 for the sake of diagram conciseness.

The storage unit 13 stores a scenario table regarding the types of auxiliary functions to be performed by the electronic device and conditions under which the auxiliary functions are to be performed. An example scenario table is illustrated in FIG. 7. The table may have two categories (for example, the state of the electronic device and the auxiliary functions). The scenario table may be designed as part of pre-prepared firmware or software provided by the manufacturer of the electronic device or may be designed by a user.

The user input unit 14 relays a command to the control unit 15 allowing a user to control the electronic device and includes a hold switch. The hold switch may be a designated key or combination of keys, or other type of input (such as a mouse click).

Figure 2:
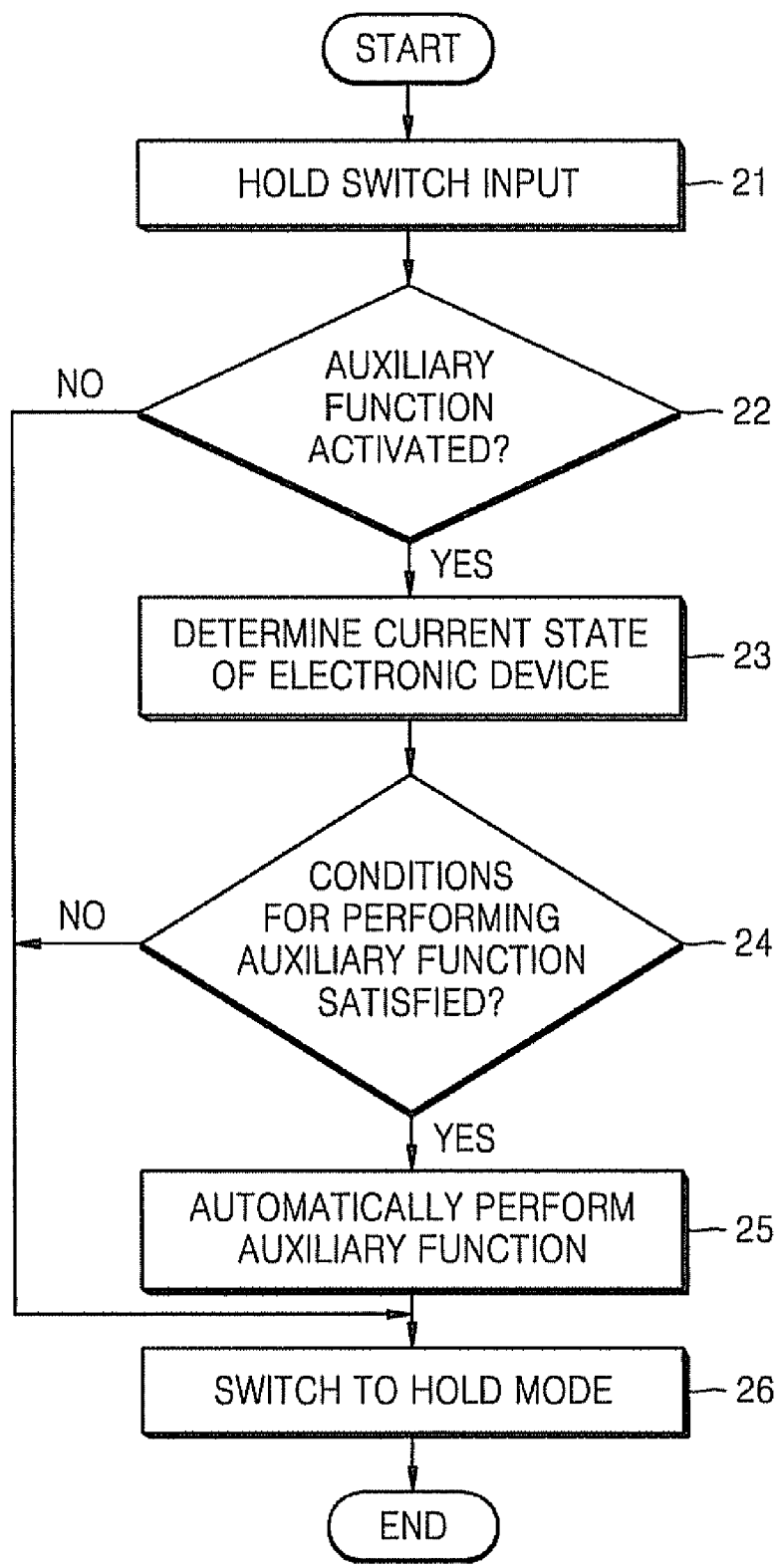
FIG. 2 is a flowchart of a technique of automatically performing auxiliary functions in an electronic device according to an embodiment of the present invention.

FIG. 2 is a flowchart of a technique of automatically performing auxiliary functions in an electronic device according to an embodiment of the present invention. When the hold switch of the electronic device is switched on by a user in operation 21, it is determined in operation 22 whether an auxiliary function has been enabled. The auxiliary function may be pre-enabled by the user. If the auxiliary function has not been enabled, the automatic performing of the auxiliary function is terminated, and the electronic device is switched to a conventional hold mode in operation 26. In the hold state, the electronic device does not respond to any key input.

The current state of the electronic device is determined in operation 23. First, the state of the control unit 15 is determined. The state may be a function that the electronic device is performing, whether the mode of the processor of the electronic device is a dual mode or a single mode, and the number of programs currently loaded in the electronic device. The electronic device may have different states as well, according to other aspects of the invention.

It is determined in operation 24 whether conditions for performing the auxiliary function are satisfied. The control unit 15 refers to the scenario table (FIG. 7) stored in the storage unit to determine whether the current state of the electronic device determined in operation 23 matches any of the states of the electronic device included in the scenario table. If the conditions for performing the auxiliary function are not satisfied, the process of performing the auxiliary function is stopped and the electronic device is put in a conventional hold state in operation 26.

When it is determined in operation 23 that the conditions to perform the auxiliary function are met, the control unit 15 refers to the scenario table to automatically perform an auxiliary function corresponding to the current state of the electronic device. The auxiliary function is performed in operation 25. After the auxiliary function is performed, the electronic device is switched to a hold state in operation 26.

A technique of automatically performing auxiliary functions in an electronic device according to an embodiment of the present invention is described below with reference to FIGS. 3 through 6.

Figure 3:
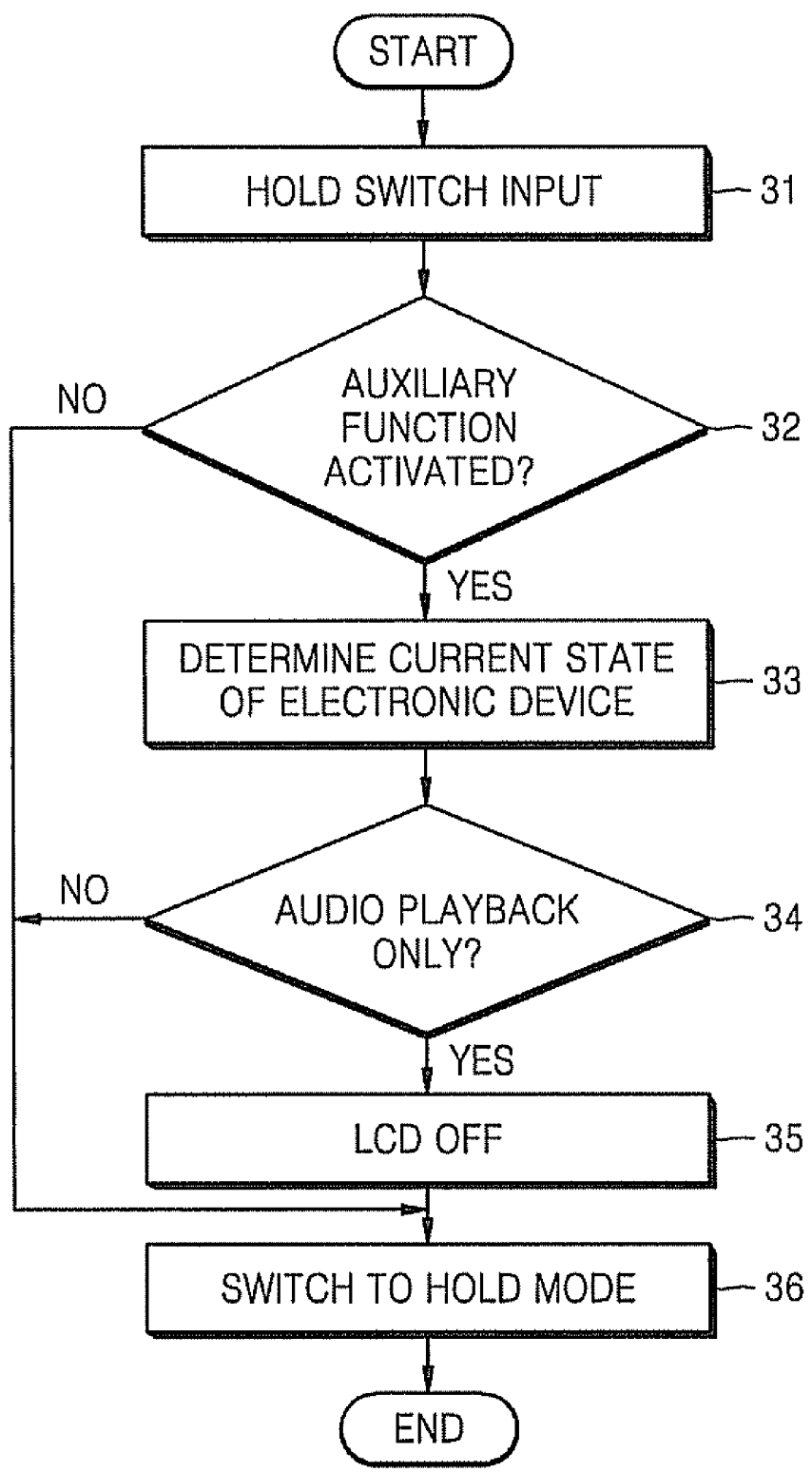
FIG. 3 is a flowchart illustrating a more detailed example of a technique of automatically performing auxiliary functions in an electronic device according to an embodiment of the present invention.

FIG. 3 illustrates a scenario in which a display, such as a liquid crystal display (LCD), is turned off when an electronic device is switched to a hold mode during audio only playback. First, it is determined in operation 32 whether the hold switch of the electronic device has been moved to an on position (in operation 31) and the auxiliary function has been activated. If the auxiliary function has been activated, then in operation 33 the current state of the electronic device 10 and the operation the electronic device 10 is performing are determined. If the electronic device 10 is currently playing back only audio, the control unit 15 searches the scenario table in FIG. 7 and determines in operation 34 whether "audio playback only" is included in the electronic device state category. If the "audio playback only" 71 is included in the electronic device state category, the control unit refers back to the scenario table, searches for an automatic performing of an "LCD off" 72 auxiliary function corresponding to the "audio playback only" 71, and turns the LCD off in the electronic device 10. In this scenario, when the electronic device 10 is playing back only audio, it is understood that the user does not wish to use the LCD.

Figure 4:
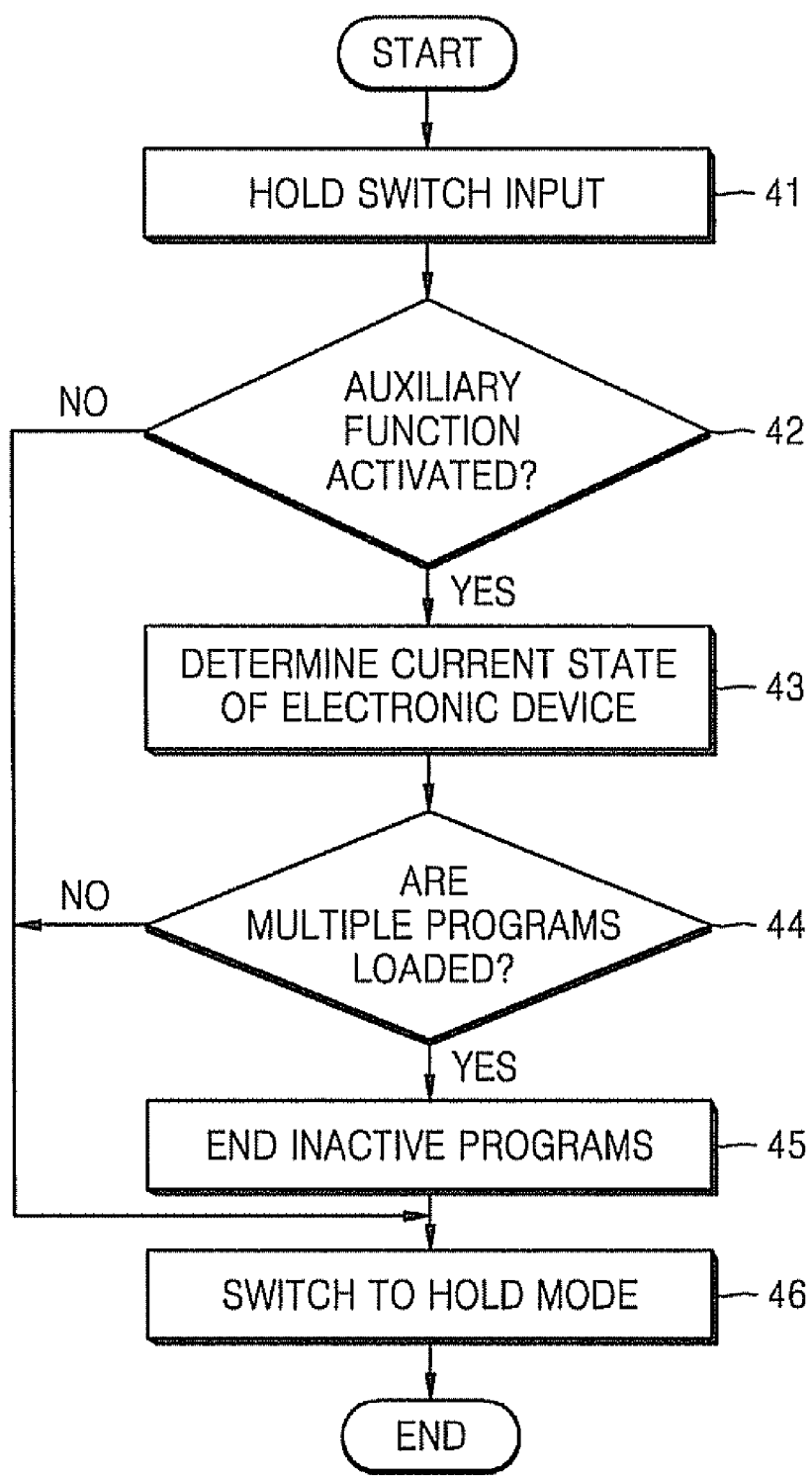
FIG. 4 is a flowchart illustrating another more detailed example of a technique of automatically performing auxiliary functions in an electronic device according to an embodiment of the present invention.

FIG. 4 illustrates a scenario to end programs that are currently inactive when an electronic device that is performing a plurality of programs is set to the hold mode. First, when it is determined in operation 42 that the hold switch of the electronic device 10 has been switched on in operation 41 and an auxiliary function has been activated, the current state of the electronic device 10 and the operation the electronic device 10 is performing are determined in operation 43. If the electronic device 10 is loading a plurality of programs (for example, a file browser, a music player, and a video player), the control unit 15 determines in operation 44 whether "multiple program loading" is included in the scenario table. If "multiple program loading" 73 is included in the scenario table, the scenario table is referred to for performing an auxiliary function (e.g. "end inactive programs" 74) corresponding to the "multiple program loading" 73. For example, if a user switches on the hold function when the processor of the electronic device 10 is currently loading programs for a file browser and a video player, but only the video player is active and the file browser is inactive, this may be interpreted as the user wanting to only view a video file, so that the processor ends the inactive file browser to lower the load on the processor.

Figure 5:
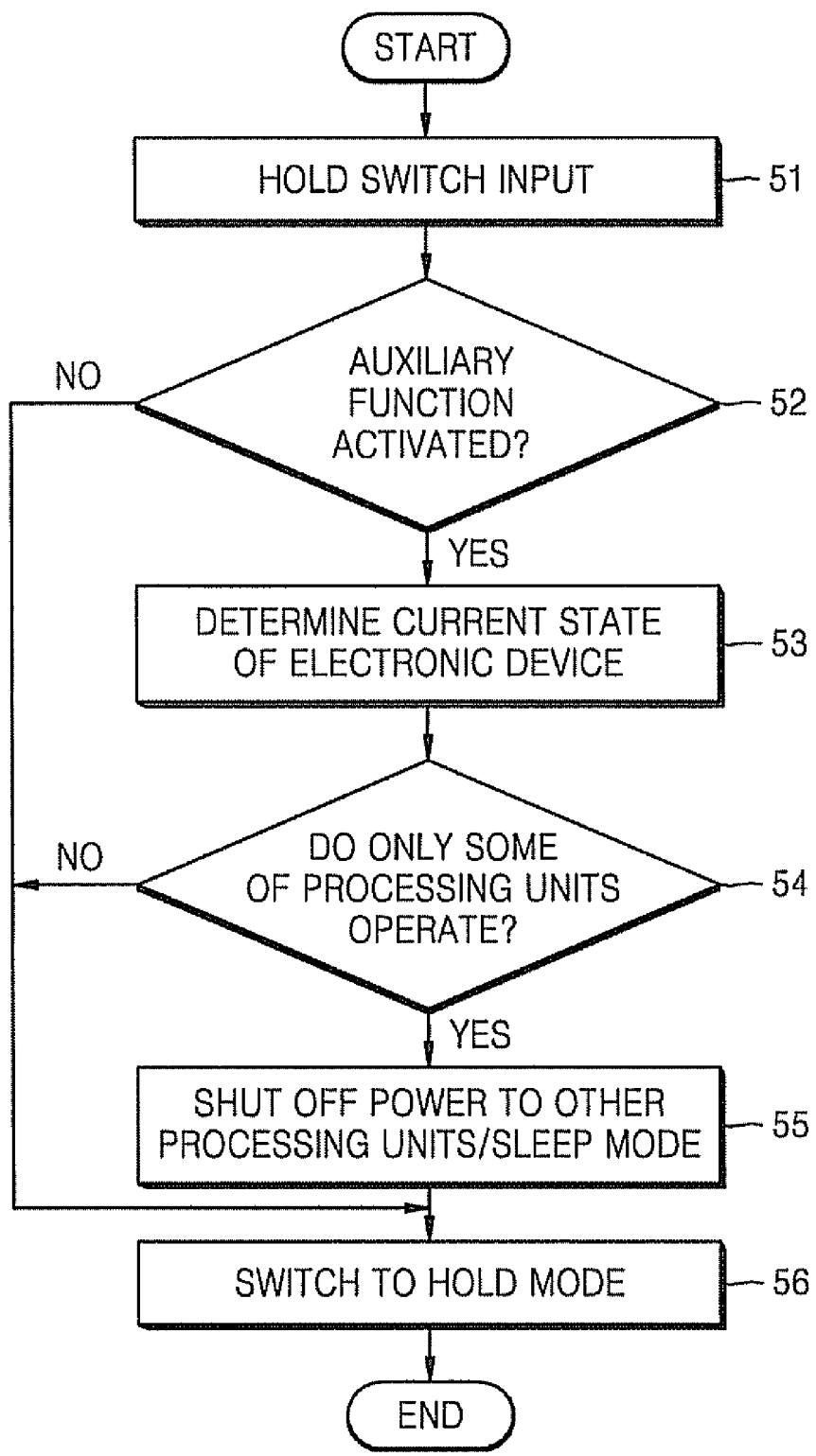
FIG. 5 is a flowchart illustrating another more detailed example of a technique of automatically performing auxiliary functions in an electronic device according to an embodiment of the present invention.

FIG. 5 illustrates a scenario where a hold switch is switched on while some of the multiple processing units of the electronic device 10 are active. Operations 51-53 are similar to operations 21-23 of FIG. 2. If only some of the multiple processing units of the electronic device 10 are active in operation 54, the inactive processing units are turned into power-off mode or sleep mode in operation 55. The electronic device 10 may include one conventional central processing unit (CPU) and one content decoder, or two conventional CPUs.

If the electronic device 10 includes a conventional CPU and a content decoder, and the CPU is running a document viewing program and the control decoder is playing back an MP3 file, then when the hold switch is turned on, the electronic device 10 presumes that the user will not be using the document viewing program for the time being. Therefore, the control unit 15 refers to the scenario table (shown in FIG. 7) and performs the auxiliary function corresponding to "some of multiple processing units are active" 75, i.e., "shut off power to other processing unit/sleep mode" 76. The controller 15 either shuts off power to the conventional CPU that was running the document viewing program or puts that CPU in sleep mode. Conversely, in other embodiments, the content decoder may have its power shut off or be put into sleep mode, and the MP3 file may be played back by the conventional CPU. Because conventional CPUs usually have low power consumption and slow processing speed, they are unsuitable for running a plurality of programs simultaneously. Thus, a conventional electronic device usually has a dual processor, including a conventional CPU and a content decoder. However, one CPU is sufficient when running only one program, so that the content decoder with its comparatively high power consumption may be replaced by the conventional CPU to play back MP3 files, in order to reduce power consumption.

Figure 6:
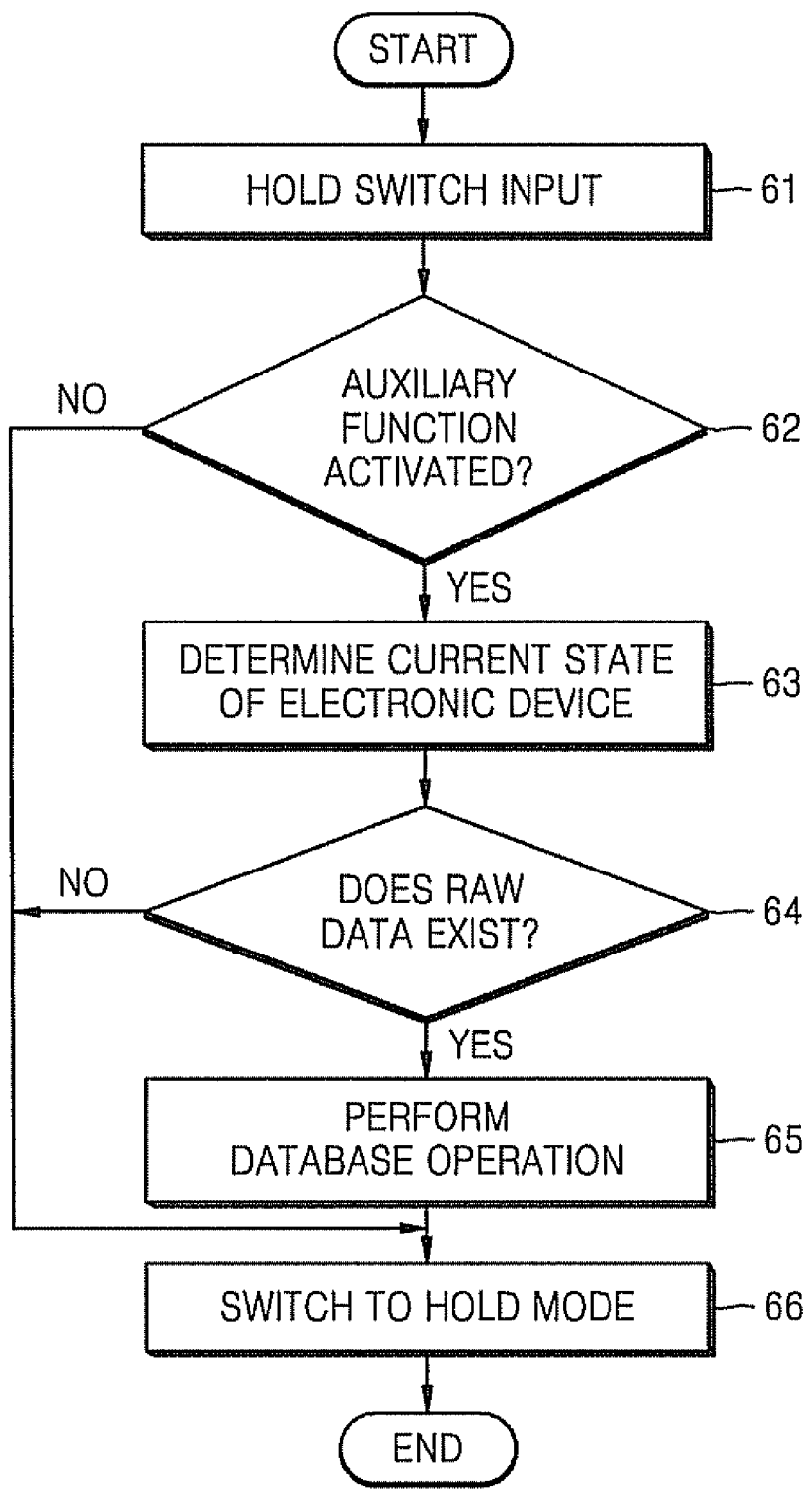
FIG. 6 is a flowchart illustrating another more detailed example of a technique of automatically performing auxiliary functions in an electronic device according to an embodiment of the present invention.

FIG. 6 illustrates a scenario in which raw data to go through a database operation exists when a hold switch of the electronic device 10 is switched on. First, when the electronic device is switched to a hold mode in operation 61 and it is determined in operation 62 that an auxiliary function has been activated, the current state of the electronic device 10 and the operation the electronic device 10 is performing are determined in operation 63 and the scenario table (shown in FIG. 7) is consulted. When it is found that there is currently "raw data to go through database operation" 77, the control unit 15 performs "database operation" 78 of the raw data, in which the control unit 15 sorts and summarizes the raw data, and creates a database of the raw data. If the electronic device 10 is a mobile electronic device, there are many instances where the raw data included in the storage unit of the mobile electronic device, for example music files, go through a database operation before the raw data is stored. However, in order to perform a database operation on the raw data, much processing is required, which can burden the processor. For instance, in order to perform the database operation, the processor must extract database (DB) data or ID3 tag data (e.g. including artist, genre, song title, etc.) The extraction can impede other programs being run by the processor. Therefore, the database operation is difficult to perform while the raw data is input to the electronic device. It is desirable to perform the database operation a time when the processor has a low rate of use (for example, during a hold state).

The techniques of automatically performing the auxiliary functions according to aspects of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like; and a computer data signal embodied in a carrier wave comprising a compression source code segment and an encryption source code segment (such as data transmission through the Internet). Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Aspects of the present invention allow an electronic device to determine the needs of a user when the user switches on a hold mode in the electronic device, while at the same time determining the state of the electronic device, in order to perform needed auxiliary functions before switching to the hold mode. Thus, power is conserved and user convenience is enhanced.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of automatically performing auxiliary functions of a hold switch, comprising:
   switching on a hold switch of an electronic device;
   performing a main function of the hold switch;
   determining whether conditions to perform the auxiliary functions of the hold switch in the electronic device have been met when the hold switch is switched on; and
   additionally performing the auxiliary functions when the conditions to perform the auxiliary functions have been met, entering a hold state when the conditions are not met, and entering the hold state when the auxiliary functions are complete;
   wherein the main function of the hold switch is switching the electronic device to or from the hold state in which the electronic device does not respond to key input,
   wherein the conditions for performing the auxiliary functions are when the electronic device has loaded a plurality of programs and the auxiliary functions include ending at least one of the plurality of programs and maintaining an operating state of at least one of the plurality of programs.

2. A method of automatically performing auxiliary functions of a hold switch, comprising:
   switching on a hold switch of an electronic device;
   performing a main function of the hold switch;
   determining whether conditions to perform the auxiliary functions of the hold switch in the electronic device have been met when the hold switch is switched on; and
   additionally performing the auxiliary functions when the conditions to perform the auxiliary functions have been met, entering a hold state when the conditions are not met, and entering the hold state when the auxiliary functions are complete;
   wherein the main function of the hold switch is switching the electronic device to or from the hold state in which the electronic device does not respond to key input
   wherein the conditions for performing the auxiliary functions are when some of a plurality of processing units are operating and the auxiliary functions include placing at least one of the processing units into a power-off mode and maintaining at least one of the processing units in a power-on mode.

3. A method of automatically performing auxiliary functions of a hold switch, comprising:
   switching on a hold switch of an electronic device;
   performing a main function of the hold switch;
   determining whether conditions to perform the auxiliary functions of the hold switch in the electronic device have been met when the hold switch is switched on; and
   additionally performing the auxiliary functions when the conditions to perform the auxiliary functions have been met, entering a hold state when the conditions are not met, and entering the hold state when the auxiliary functions are complete;
   wherein the main function of the hold switch is switching the electronic device to or from the hold state in which the electronic device does not respond to key input
   wherein the conditions for performing the auxiliary functions are when raw data to go through a database operation is stored in a storage unit of the electronic device and the auxiliary functions include performing the database operation, the method further comprising delaying the performing of the database operation during non-hold mode operation to be performed in the hold mode.

4. An apparatus to automatically selectively perform one or more auxiliary functions of a hold switch of an electronic device, the apparatus comprising:
- a storage unit to store a table including at least one condition of at least the electronic device to be analyzed for directing selective performance of at least one corresponding auxiliary function, identified in the table, of the hold switch during a same switched on state of the hold switch; and
- a control unit to control operation of the electronic device during the same switched on state to selectively control at least an entering of a hold state for performing a main function of the hold switch and one or more of the at least one corresponding auxiliary function,
- wherein the control unit selectively, during the same switched on state, performs the entering and performing of the main function of the hold switch based on a determination whether one or more of the at least one condition, existing during a corresponding switching of the hold switch to the same switched on state, is not met, performs the one or more of the at least one corresponding auxiliary function based on the determination, and performs the entering and the performing of the main function of the hold switch based upon the determination and a detection of a completion of the one or more of the at least one corresponding auxiliary function.

5. The apparatus of claim 4, wherein the main function of the hold switch is controlling the electronic device to not respond to key input.

6. The apparatus of claim 5, wherein the table identifies potential states of the electronic device and auxiliary functions corresponding to the states.

7. The apparatus of claim 6, wherein the control unit automatically performs an auxiliary function corresponding to one of the states of the electronic device included in the table that matches a current state of the electronic device.

8. The apparatus of claim 5, wherein the table is created directly by a user after manufacture.

9. The apparatus of claim 5, wherein the apparatus is included within the electronic device.

10. The apparatus of claim 9, wherein the electronic device is a portable electronic device.

11. A method of automatically selectively performing one or more auxiliary functions of a hold switch of an electronic device, comprising:
- observing whether the hold switch is in a same switched on state to selectively control, during the same switched on state, at least an entering of a hold state for performing a main function of the hold switch and performance of the one or more auxiliary functions;
- determining whether one or more conditions, existing during a corresponding switching of the hold switch to the same switched on state, of at least the electronic device is met;
- selectively, during the same switched on state, performing the entering and performing of the main function of the hold switch when the determining indicates that at least one of the one or more conditions is not met, performing the one or more auxiliary functions when the determining indicates that at least one of the one or more conditions is met, and performing the entering and the performing of the main function of the hold switch based upon the determining and a detection of a completion of the at least one of the one or more auxiliary functions.

12. The method of claim 11, wherein the main function of the hold switch is controlling the electronic device to not respond to key input.

13. The method of claim 12, further comprising:
- analyzing which of the auxiliary functions of the electronic device have been activated,
- wherein the determining of whether the one or more conditions is met determines only whether conditions respectively corresponding to the activated auxiliary functions are met and/or the performing of the one or more auxiliary functions selectively performs only the activated.

14. The method of claim 12, further comprising determining a current state of the electronic device.

15. The method of claim 12, further comprising switching the electronic device to the hold state.

16. The method of claim 12, further comprising pre-generating a scenario table to be used in the determining of whether the one or more conditions is met.

17. The method of claim 16, wherein the determining further comprises determining whether a current state of the electronic device matches one of a plurality of states included in the scenario table.

18. The method of claim 12, wherein one of the one or more conditions is whether the electronic device is playing back only audio during the switching on of the hold switch to the same switched on state.

19. The method of claim 12, wherein one of the one or more conditions is whether the electronic device has currently loaded a plurality of programs during the switching on of the hold switch to the same switched on state, and the performing of the one or more auxiliary functions includes performing an ending at least one of the loaded plurality of programs and maintaining an operating state of at least one of the plurality of programs.

20. The method of claim 12, wherein one of the one or more conditions is whether some of a plurality of processing units are currently operating during the switching on of the hold switch to the same switched on state, and the performing of the one or more auxiliary functions includes performing a placing of at least one of the processing units into a power-off mode and maintaining at least one of the processing units in a power-on mode.

21. A non-transitory computer-readable recording medium storing a program to implement a method of automatically selectively performing one or more auxiliary functions of a hold switch of an electronic device, the method comprising:
- observing whether the hold switch is in a same switched on state to selectively control, during the same switched on state, at least an entering of a hold state for performing a main function of the hold switch and a performing of the one or more auxiliary functions;
- determining whether one or more conditions, existing during a corresponding switching of the hold switch to the same switched on state, of at least the electronic device is met;
- selectively, during the same switched on state, performing the entering and performing of the main function of the hold switch when the determining indicates that at least one of the one or more conditions is not met, performing the one or more auxiliary functions when the determining indicates that at least one of the one or more conditions is met, and performing the entering and the performing of the main function of the hold switch based upon the determining and a detection of a completion of the at least one of the one or more auxiliary functions.

22. The non-transitory computer-readable recording medium of claim 21, wherein the main function of the hold switch is controlling the electronic device to not respond to key input.

23. The non-transitory computer-readable recording medium of claim 22, wherein the determining comprises consulting a scenario table.

24. The non-transitory computer-readable recording medium of claim 23, wherein the scenario table is pre-generated.

25. The computer-readable recording medium of claim 22, wherein the scenario table is generated by the user after manufacture.

26. A non-transitory computer readable medium comprising a scenario table and instructions that, when executed by an electronic device, cause the electronic device to perform a method comprising:
 determining whether to perform one or more of auxiliary functions of a hold switch by consulting the scenario table based on conditions of the electronic device existing during a corresponding switching of the hold switch to a same switched on state; and
 selectively, during the same switched on state, performing an entering and performing of a main function of a hold state of the hold switch when the determining indicates that no auxiliary functions are to be performed during the same switched on state, performing at least one of the one or more auxiliary functions as indicated by the scenario table when the determining indicates that the at least one of the one or more auxiliary functions is to be performed, and performing the entering and the performing of the main function of the hold state upon the determining and a detection of a completion of all performed auxiliary functions.

27. The non-transitory computer-readable recording medium of claim 26, wherein the main function of the hold switch is controlling the electronic device to not respond to key input.

28. A method of managing an electronic device, when a same hold mode of the electronic device is switched on to a corresponding switched on state, by selectively performing a main function of the same hold mode and one or more auxiliary functions of the same hold mode, the method comprising:
 selectively, during the corresponding switched on state of the same hold mode, performing an entering and performing of the main function of a hold state of the same hold mode when no auxiliary functions are performed during the same hold mode according to one or more observed states of the electronic device existing while the same hold mode is being switched on to the corresponding switched on state, performing at least one of the one or more auxiliary functions of the same hold mode based on the one or more observed states of the electronic device, and performing the entering and the performing of the main function of the hold state of the same hold mode based upon the one or more observed states and a detection of a completion of the at least one of the one or more auxiliary functions.

29. The method of claim 28, wherein the main function of the hold mode is controlling the electronic device to not respond to key input.

30. The method of claim 29, wherein the performing at least one auxiliary function comprises:
 consulting a scenario table to determine the at least one auxiliary function to perform;
 performing the at least one auxiliary function indicated by the scenario table.

31. The method of claim 29, wherein the auxiliary function is pre-enabled by a user after manufacture.

32. An electronic device selectively performing a main function of a same hold mode and one or more auxiliary functions of the same hold mode, when the same hold mode of the electronic device is in a corresponding switched on state, comprising:
 a control unit to control the electronic device to selectively, during the corresponding switched on state of the same hold mode, perform an entering and performing of a main function of a hold state of the same hold mode when no auxiliary functions are performed during the same hold mode according to one or more observed states of the electronic device existing while the same hold mode is being switched on to the corresponding switched on state, perform at least one of the one or more auxiliary functions of the same hold mode based on the one or more observed states of the electronic device, and perform the entering and the performing of the main function of the hold state of the same hold mode based upon the one or more observed states and a detection of a completion of the at least one of the one or more auxiliary functions.

33. The electronic device of claim 32, wherein the main function of the hold mode is controlling the electronic device to not respond to key input.

* * * * *

UNITED STATES PATENT AND TRADEMARK OFFICE
CERTIFICATE OF CORRECTION

PATENT NO.         : 8,116,887 B2                                          Page 1 of 1
APPLICATION NO.    : 11/737522
DATED              : February 14, 2012
INVENTOR(S)        : Jeong-hun Park et al.

It is certified that error appears in the above-identified patent and that said Letters Patent is hereby corrected as shown below:

Column 6, Line 39, In Claim 2, delete "input" and insert -- input, --, therefor.

Column 6, Line 60, In Claim 3, delete "input" and insert -- input, --, therefor.

Column 8, Line 9, In Claim 13, delete "activated." and insert -- activated auxiliary functions. --, therefor.

Column 9, Line 31, In Claim 27, delete "computer-readable recording" and insert -- computer readable --, therefor.

Signed and Sealed this
Nineteenth Day of June, 2012

David J. Kappos
*Director of the United States Patent and Trademark Office*